United States Patent [19]

Shizawa et al.

[11] Patent Number: 5,086,456
[45] Date of Patent: Feb. 4, 1992

[54] DIAL UNIT DETACHABLY MOUNTED ON PUBLIC TELEPHONE FOR EQUAL ACCESS

[75] Inventors: Masahiro Shizawa; Katsuhiro Taka; Hiroshi Ogihara, all of Atsugi, Japan

[73] Assignee: Anritsu Corporation, Tokyo, Japan

[21] Appl. No.: 509,861

[22] Filed: Apr. 16, 1990

[30] Foreign Application Priority Data

Apr. 24, 1989 [JP] Japan .................................. 1-103776

[51] Int. Cl.$^5$ ............................................. H04M 3/42
[52] U.S. Cl. .................................. 379/132; 379/131; 379/221; 379/201
[58] Field of Search ............... 379/131, 132, 130, 221, 379/369, 201

[56] References Cited

U.S. PATENT DOCUMENTS

| | | | |
|---|---|---|---|
| 4,565,903 | 1/1986 | Riley | 379/201 X |
| 4,577,066 | 3/1986 | Bimonte et al. | 379/221 |
| 4,685,127 | 8/1987 | Miller et al. | 379/221 |
| 4,769,834 | 9/1988 | Billinger et al. | 379/221 X |
| 4,782,519 | 11/1988 | Patel et al. | 379/221 |
| 4,791,665 | 12/1988 | Bogart et al. | 379/221 X |
| 4,924,497 | 5/1990 | Smith et al. | 379/132 X |
| 4,926,469 | 5/1990 | Smith et al. | 379/132 X |

Primary Examiner—James L. Dwyer
Assistant Examiner—M. Shehata
Attorney, Agent, or Firm—Frishauf, Holtz, Goodman & Woodward

[57] ABSTRACT

A dial unit is detachably mounted on a public telephone for equal access and includes a keypad section, a registration table section, a determination processing section, and a transmitting section. The keypad section key-inputs a dial signal. In the registration table section, area codes corresponding to specific destinations to be handled as a long-distance call and a carrier code corresponding to a specific carrier line having a right of a carrier to the specific destinations are registered in advance. The determination processing section includes a dial signal determination section for determining whether or not the first digit of a dial signal to be handled for a long-distance call coincides with either a "1" or a "0", a dial signal storage section, an equal access determining section, and a carrier code adding section. The transmitting section converts the dial signal, which is temporarily stored in the dial signal storage section when a non-coincidence is determined by the equal access determining section, or the dial signal, to which the carrier code is added by the carrier code adding section when a coincidence is determined, into corresponding DTMF signals and sequentially transmits the DTMF signals after key input by the keypad section is completed.

5 Claims, 13 Drawing Sheets

| Address | Contents | Hex |
|---|---|---|
| 0 | I/O PORT | $0000 |
| 127 | | $007F |
| 128 | RAM (128 BYTES) DIAL TEMPORARY STORAGE | $0080 |
| 255 | | $00FF |
| 256 | (EMPTY) | $0100 |
| 4095 | | $0FFF |
| 4096 | EPROM STORAGE OF PROGRAM OR THE LIKE (4k BYTES) | $1000 |
| 8181 | | $1FF5 |
| 8182 | VECTOR | $1FF6 |
| 8191 | | $1FFF |
| 8192 | EEPROM (PAGE 1) STORAGE OF AREA CODE, PREFIX CODE, CARRIER CODE AND THE LIKE (4k BYTES) | $2000 |
| 12287 | | $2FFF |
| 12288 | EPROM STORAGE OF PROGRAM OR THE LIKE (4k BYTES) | $3000 |
| 16383 | | $3FFF |

EEPROM (PAGE 2) STORAGE OF AREA CODE, PREFIX CODE, CARRIER CODE AND THE LIKE (4k BYTES)  $2000 – $2FFF

DIAL UNIT DETACHABLY MOUNTED ON PUBLIC TELEPHONE FOR EQUAL ACCESS

BACKGROUND OF THE INVENTION

1. Field of the Invention

The present invention generally relates to a dial unit and, more particularly, to a dial unit which is detachably mounted on a public telephone installed in the U.S.A. and can easily respond to so-called equal access for a long-distance call.

2. Description of the Related Art

As is well known, many local telephone services are provided by groups of local telephone companies (BOCs) affiliated to Bell Telephone Companies divided from American Telephone & Telegraph Co (AT & T) in the U.S.A.. These local telephone companies are required to provide equal access to users in long-distance carriers (lines) other than those of AT & T.

In this case, equal access means that when calling long distance, a specific long-distance line is automatically selected so that a user can make a long-distance call by only dialing a destination telephone number rather than by dialing a specific code to call the specific long-distance line.

Such a situation is described in U.S. Pat. No. 4,685,127. This patent discloses a technique of managing equal access by using a specific exchange installed in a telephone office.

In the above-described technique, however, since equal access is managed by a specific exchange (No. 5 crossbar exchange) in a telephone office, no versatility is expected, and the technique is not easy to execute.

A new approach to equal access, therefore, is demanded. That is, a technique having versatility and allowing easy execution outside telephone offices is demanded.

With regard to public telephones installed in a specific area in the U.S.A., the BOCs are admitted to perform line-connection-workings for long-distance calls corresponding to the carrier respectively. However, according to the decision in the Green's case in October, 1988, it is decided from the viewpoint of equal access that whether to use both lines of the BOCs and long-distance carrier lines of other long-distance telephone companies is determined on the basis of votes of owners of the premises where the telephones are installed.

If the owners desire to use the lines of both the telephone companies and select the lines of the BOCs, dial units capable of such equal access may be mounted on the already-installed public telephones in accordance with the above-described new approach.

More specifically, such a dial unit is designed to send a carrier code for connecting a public telephone to a line of the BOCs, in response to an outgoing call from the public telephone to a specific area, in accordance with a dial number input therefrom, before the dial number is output and to handle outgoing calls to other areas in a conventional manner.

It is apparent that such a dial unit must be detachably mounted on a public telephone with a minimum modification with respect to the public telephone. In addition, the dial unit is required to hande outgoing calls to specific areas in the same manner as normal outgoing calls with respect to a user and an exchange (office side). Moreover, the dial unit is required to allow easy maintenance and to realize compatibility with several types of public telephones.

SUMMARY OF THE INVENTION

It is, therefore, an object of the present invention to provide a new and improved dial unit detachably mounted on a public telephone for equal access, in which dial signals input to the public telephone are checked therein, a carrier code is added to the front portion of only a dial signal for calling a specific area (destination) and is transmitted to a telephone line in order to perform equal access, and dial signals for calling other areas can be handled in the same manner as in operation of a normal public telephone, including the conventional operations, in an easy manner with high reliability.

According to the present invention, there is provided a dial unit detachably mounted on a public telephone for equal access, the dial unit comprising:

keypad means for key-inputting a dial signal;

registration table means in which area codes corresponding to specific destinations to be handled as a long-distance call and a carrier code corresponding to a specific carrier line having a right of a carrier to the specific destinations are registered in advance;

determination processing means comprising:

(a) dial signal determination means for identifying dial signals of "1" or "0"]for the first digit, or other dial signals, from among the dial signals key-input by the keypad means;

(b) dial signal storage means for temporarily storing the dial signal of "1" or "0" for the first digit, when such a signal is identified by the dial signal determination means;

(c) equal access determining means for determining a coincidence or a non-coincidence of the area code of the dial signal temporarily stored in the dial signal storage means with one of the area codes corresponding to the specific destinations which are registered in the registration table means in advance; and (d) carrier code adding means for adding the carrier code registered in the registration table means in advance and corresponding to the specific carrier line, to the front portion of the dial signal temporarily stored in the dial signal storage means when a coincidence is determined by the equal access determining means; and transmitting means including converting means for converting other dial signals sorted by the dial signal sorting means into corresponding DTMF signals in synchronism with key input by the keypad means and speech control means for sequentially transmitting the DTMF signals to a telephone line connected to the public telephone, and converting the dial signal, which is temporarily stored in the dial signal storage means when a non-coincidence is determined by the equal access determining means, or the dial signal with the carrier code added by the carrier code adding means when a coincidence is determined, into corresponding DTMF signals and sequentially transmitting the DTMF signals after key input by the keypad means is completed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

Reference will now be made in detail to the presently preferred embodiment of the invention as illustrated in the accompanying drawings, in which like reference characters designate like or corresponding parts through the several drawings.

1. Outline and Circuit Arrangement of Dial Unit

A dial unit of the present invention is designed to be mounted on a public telephone in specific areas in the U.S.A., and to respond to only a speech communication between the specific areas. The dial unit adds a carrier code to the front portion of a dial signal based on a number dialed by a user of the public telephone, and transmits a corresponding DTMF (Dual Tone Multi Frequency) signal to an office through a speech loop. The dial unit is called a carrier selection kit (to be referred to as a kit hereinafter).

The kit is mounted on the inner surface of the front cover of an already-installed public telephone and is wired by using a terminal board (e.g., a TB2) on the rear surface of a dial keypad, as will be described later.

Figure 1:
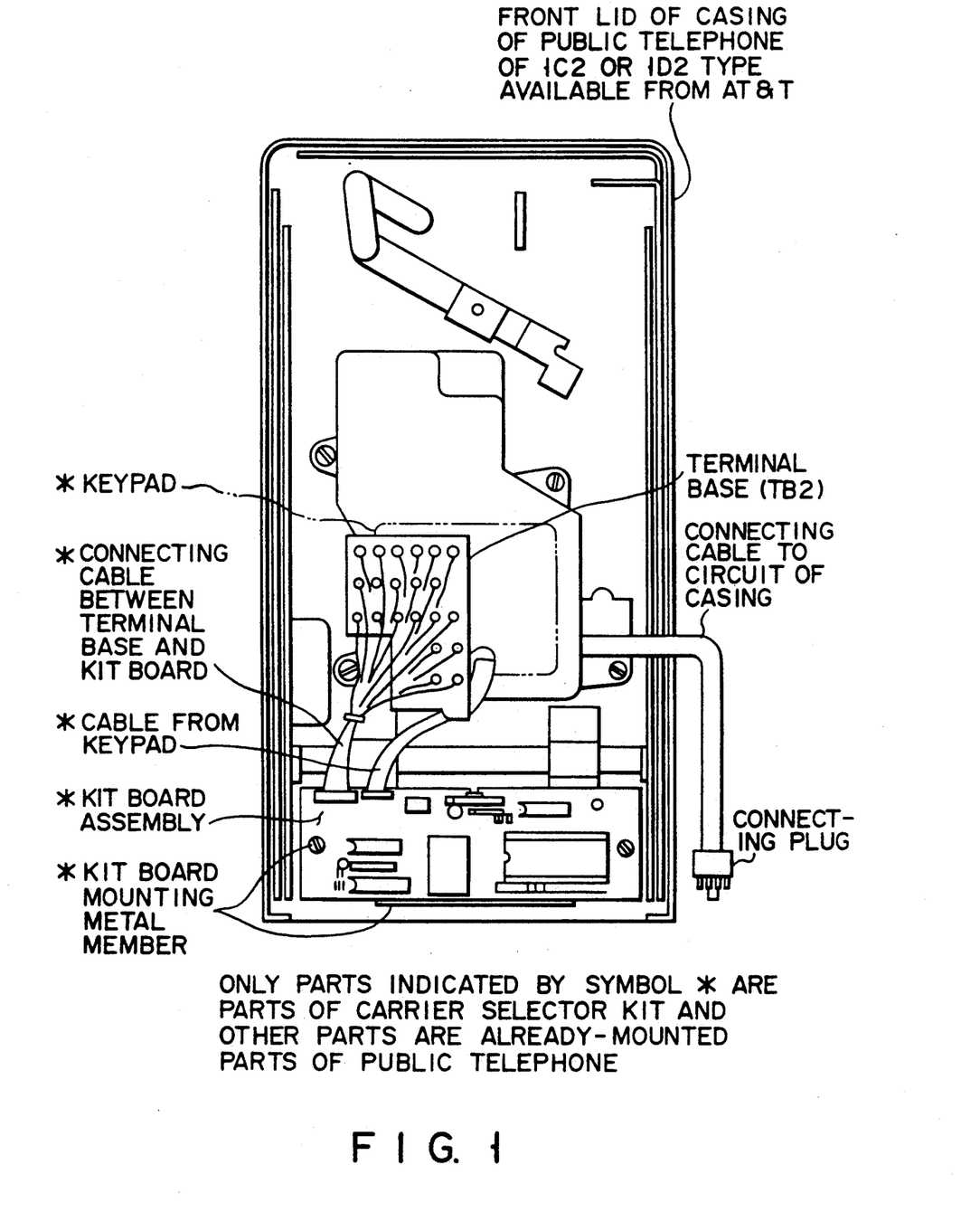
FIG. 1 is a view showing a dial unit (also called a carrier selection kit) according to the embodiment of the present invention.

FIG. 1 shows an embodiment of the kit of the present invention.

The kit comprises a keypad with a cable, a kit board assembly, a kit board mounting metal member, and a connecting cable. The kit is mounted on an already-installed public telephone (IC2 or ID2) by removing an already-mounted dial unit from the inner surface of the front cover of the public telephone, and the connecting cable from the kit board is wired to a terminal board TB2 on the rear surface of a keypad in accordance with the public telephone. That is, the kit can be easily made compatible with an already-installed public telephone by only changing the wiring of the connection cable to a terminal board TB2.

Figure 2:
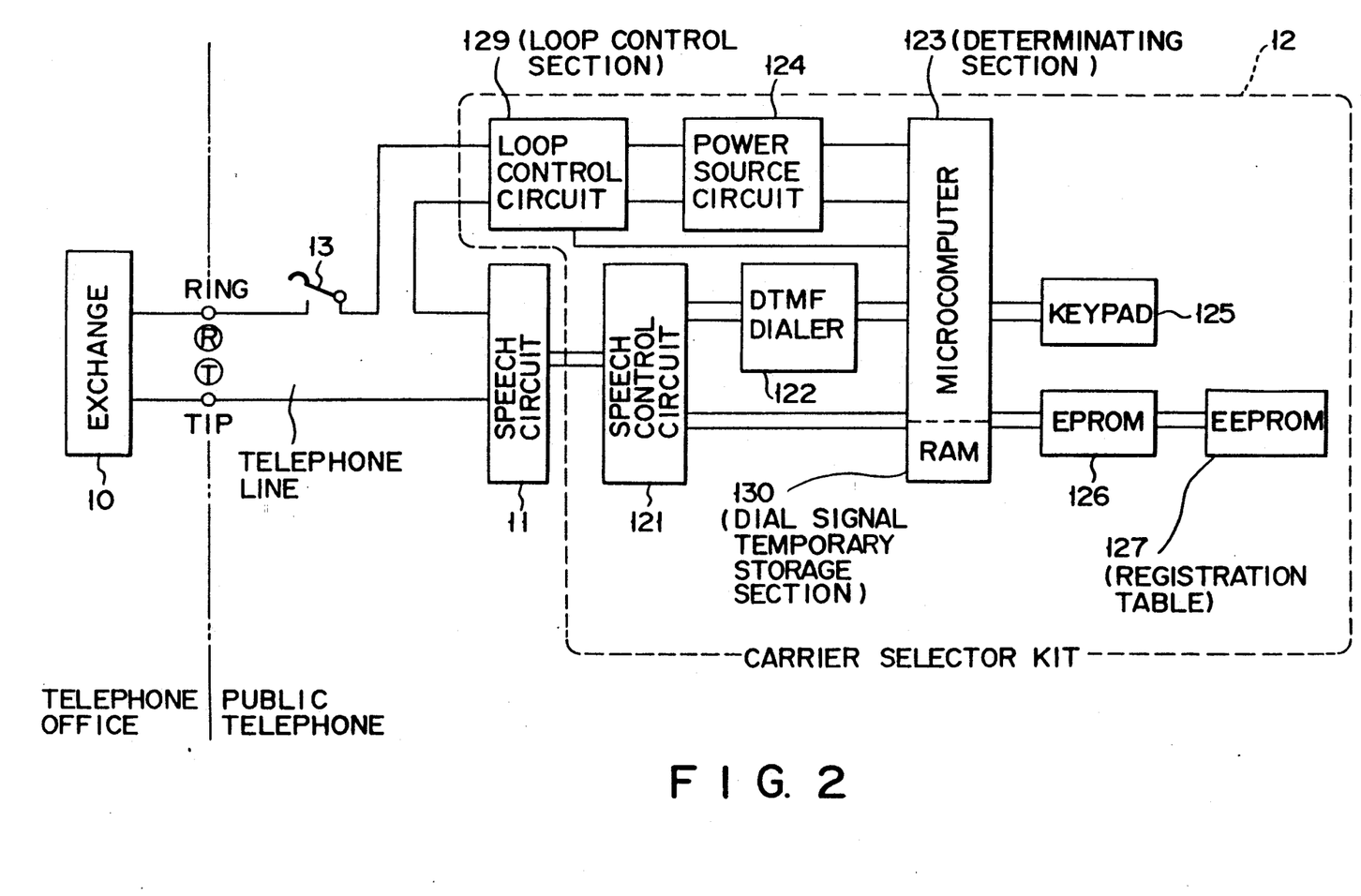
FIG. 2 is a block diagram showing a schematic arrangement of the dial unit.

FIG. 2 is a block diagram showing an arrangement of the kit.

Referring to FIG. 2, a portion surrounded with a dotted line corresponds to a kit 12. The kit 12 comprises: a speech control circuit 121 connected to a speech circuit (public telephone) 11 which is connected to an exchange 10 on the telephone office side through a telephone line; a DTMF dialer 122 and a microcomputer 123 connected to the speech control circuit 121; a keypad 125; an EPROM 126; an EEPROM 127; a power source circuit 124 for applying a power source voltage to the respective components including the microcomputer (MPU) 123 by using a speech loop current from the telephone line; and a loop control circuit 129 for performing the control of a speech loop equivalently to an on-hook state.

Note that reference numeral 13 in FIG. 2 denotes a hook switch of the public telephone, which serves to connect the telephone line to the speech circuit. Whe a handset of the public telephone is picked up to set the telephone in an off-hook state, the hook switch 13 is turned on. As a result, the speech loop is formed by a tip (T) of the telephone line, the speech circuit 11, the speech control circuit 121, the speech circuit 11, the loop control circuit 129, the power source circuit 124, the loop control circuit 129, the hook switch 13, and a ring (R) of the telephone line, and a loop current flows through the loop.

The power source circuit 124 applies a predetermined power source voltage to the respective components including the microcomputer 123 through the loop current, thus setting the kit in an operative state.

If a user depresses keys of the keypad 125 in this state and inputs a specific dial number for a long-distance call, data (dial signal) based on this dial number is temporarily stored in a RAM 130 in the microcomputer 123. Note that programs of the microcomputer 123 are stored in the EPROM 126 and area codes, prefix codes, and carrier codes are registered in the EEPROM 127 in advance. The microcomputer 123 checks whether the first digit of the input dial number data is "0" or "1" so as to determine whether to process the data in the same manner as in a normal public telephone. In addition, the microcomputer 123 determines whether to add a carrier code or not if a required number of digits are key-input by a user. In accordance with such a determination result from the microcomputer 123, the DTMF dialer 122 transmits a necessar DTMF tone signal from the speech control circuit 121 to the telephone line through the speech circuit 11.

Figure 3:
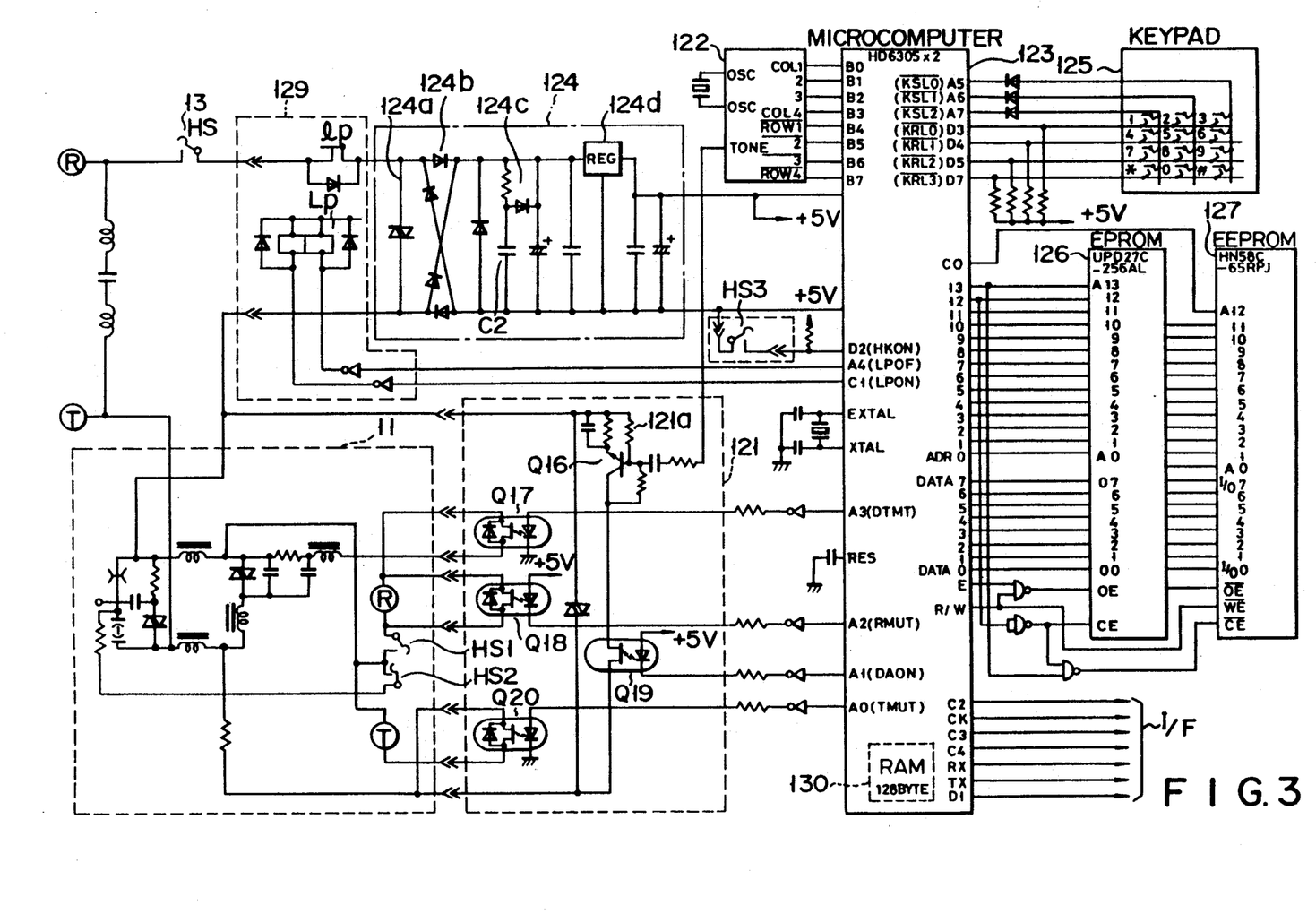
FIG. 3 is a circuit diagram showing a detailed arrangement of the dial unit in FIG. 2.

FIG. 3 shows a detailed arrangement of the kit 12.

The power source circuit 124 will be described with reference to FIG. 3. The power source circuit 124 includes a rectifier circuit section 124b, a charging circuit section 124c, and a regulator section 124d which are cascade-connected to a protective circuit section 124a connected to the output stage of the loop control circuit 129 in FIG. 1.

In this case, the charging circuit section 124c includes a backup capacitor C2, a so-called super capacitor, having a large capacitance (e.g., 0.022 F). When the telephone line (loop) is forcibly set in a temporarily-disconnected state (i.e., equivalent to an on-hook state) in order to prevent timeout on the telephone office side, the charging circuit section 124c prevents a power source drop by using a voltage charged in the backup capacitor C2 so as to allow the microcomputer 123 in the kit to continue its processing at least for a necessary period.

That is, in a dial signal processing system by means of the kit 12, when it is determined whether to add a carrier code, a DTMF signal is transmitted to the loop after a dial operation of a user is completed. Therefore it is required to prevent timeout (about 16 seconds after an on-hook operation) in the office side. For this reason, in the kit 12, for example, a latching type LP relay having a low power consumption is arranged in the loop control circuit 129 so as to break an lp contact of the relay with an LPOF output pulse signal (H level) from the microcomputer 123 every 15 seconds after a dial operation for the first digit, and to make the lp contact with an LPON output pulse signal (H level) after a predetermined period of time (about 1.6 seconds), thereby setting the lp contact in a break state, which is equivalent to forcible disconnection of the loop, i.e., an on-hook state, for a predetermined period of time (about 1.6 seconds) every 15 seconds. During this loop forcible disconnection period, necessary processing is continued by using the voltage charged in the backup capacitor C2. With this operation, even if a dial operation of the user is continued for more than a timeout time (16 seconds) set in the office, a DTMF can be output to the loop under the same conditions as set when a dial operation is completed within 16 seconds.

Referring to FIG. 3, the speech control circuit 121 includes a dialer amplifier 121a for amplifying a DTMF signal from the DTMF dialer 122, a switching element Q19, series-connected to the dialer amplifier 121a, for selectively outputting the amplified DTMF signal to th telephone line, a switching element Q17 for muting a dial tone supplied from the exchange 10 through the telephone line during temporary storage of the dial number when the handset is set in an off-hook state, a switching element Q18 for muting the receiver when the temporarily stored dial number is continuously transmitted to the telephone line, and a switching element Q20 for muting the transmitter.

The switching elements Q17, Q18, Q19, and Q20 are constituted by, e.g., optical MOSs which have low power consumption and have completely isolated inputs an outputs. The outputs of the respective switching elements are connected to corresponding output signals DTMT, RMUT, DAON, and TMUT of the microcomputer 123 through inverter IC gates and resistors.

When the DTMF signal is to be output to the telephone line, the DAON output signal from the microcomputer 123 is set at H level to turn on the switching element Q19. As a result, a loop current flows through a loop consisting of the tip (T) of the telephone line, the speech circuit 11, the switching element Q19 and the dialer amplifier 121a of the speech control circuit 121, the loop control circuit 129, a rectifying diode and a Zener diode of the rectifier circuit section 124b of the power source circuit 124, the lp relay contact of the loop control circuit 129, the hook switch 13, and the ring (R) of the telephone line, and the DTMF signal is transmitted to the telephone line.

When a dial tone from the exchange 10 is to be muted, the DTMT output signal from the microcomputer 123 is set at H level to turn off the switching element Q17. As a result, a reception loop of the speech circuit constituted by the speech circuit 11, a hook switch HS1, a receiver R, and the switching element Q17 of the speech control circuit 121 is disconnected at the switching element Q17.

When the receiver R is to be muted, the RMUT output signal from the microcomputer 123 is set at H level to turn on the switching element Q18 so as to completely shunt the input terminal of the receiver R.

When the transmitter T is to be muted, the TMUT output signal from the microcomputer 123 is set at H level to turn off the switching element Q20. As a result, a speech loop constituted by the tip (T) of the telephone line, the speech circuit 11, the switching element Q20 of the speech control circuit 121, the transmitter T, the speech circuit 11, the loop control circuit 129, the rectifying diode and the Zener diode of the rectifier circuit section 124b of the power source circuit 124, the lp relay contact of the loop control circuit, the hook switch 13, and the ring (R) of the telephone line is disconnected at the switching element Q20.

When the transmitter T is to be muted, since the speech loop is disconnected, the speech loop must be formed in advance by setting the DAON output signal from the microcomputer 123 at H level. If the polarities of the telephone line are reversed, a current can be caused to flow through the same loop in the opposite direction due to an internal diode of the optical MOS (Q20), and hence the speech loop can be maintained.

Figure 4:
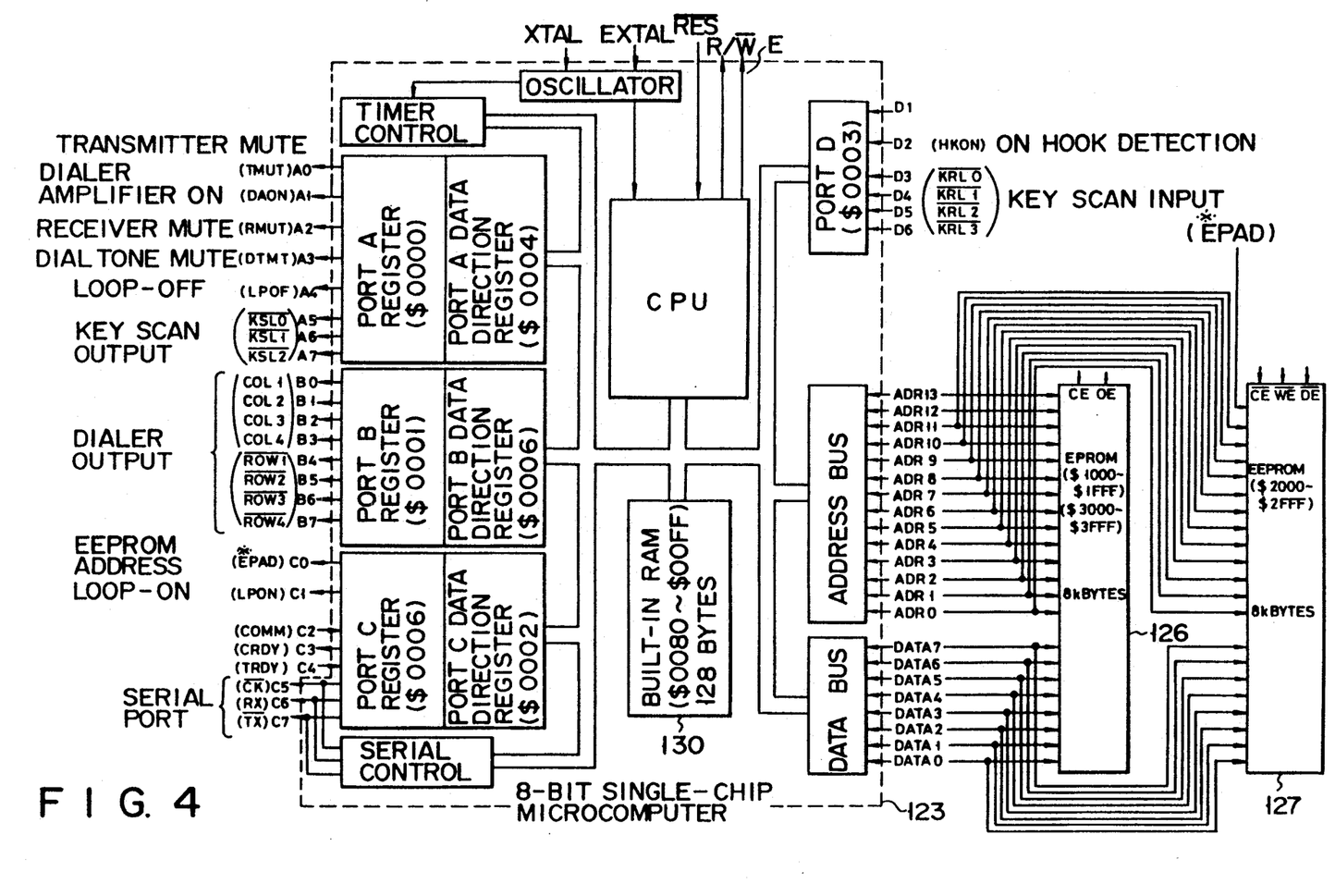
FIG. 4 is a block diagram showing an arrangement of a microcomputer used in the dial unit in FIG. 2.
Figure 5:
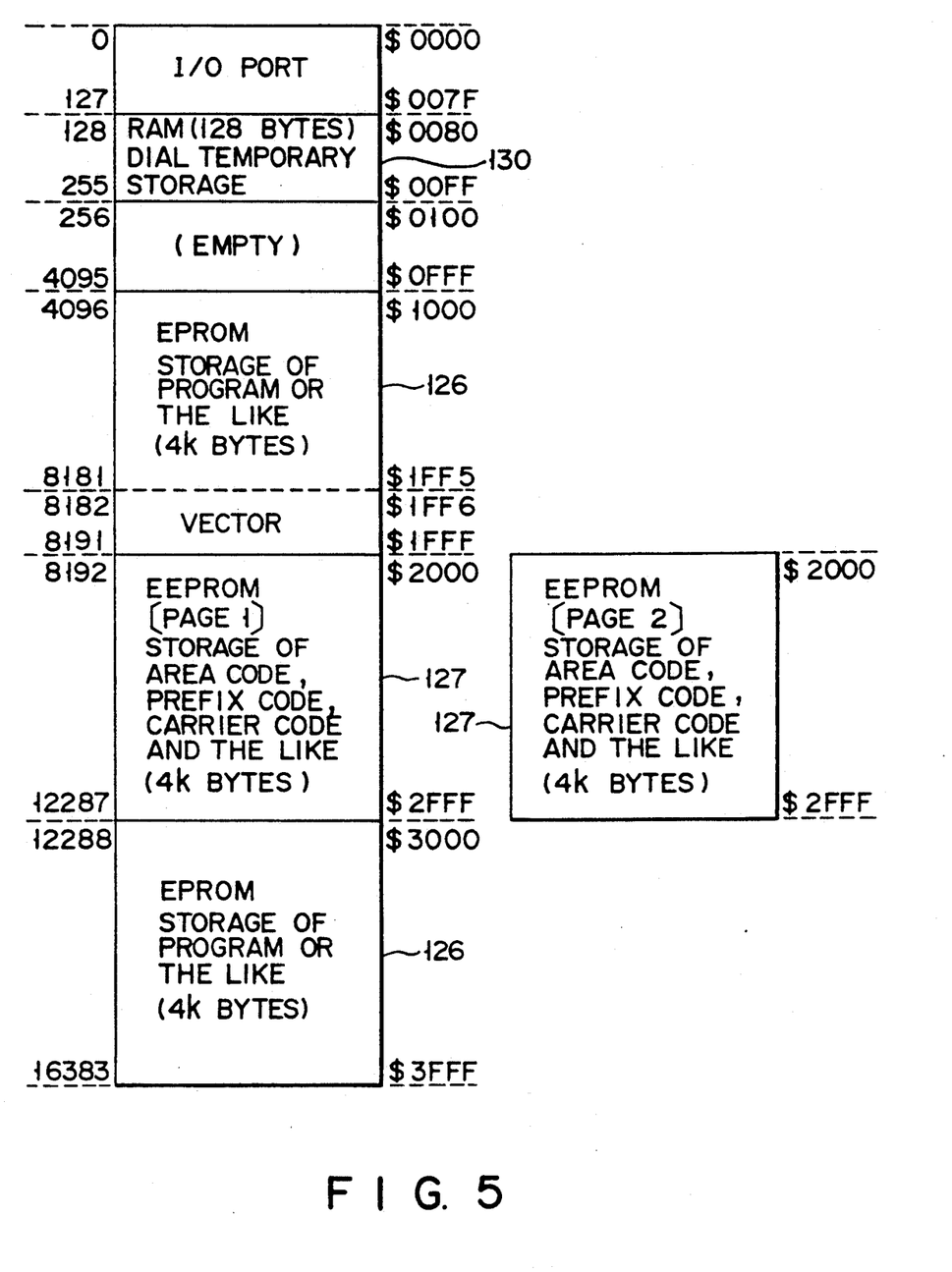
FIG. 5 is a view showing an overall memory map used in the dial unit in FIG. 2.

The above-described dial function will be described in detailed later. For the sake of a description, FIG. 4 shows an arrangement of the microcomputer, and FIG. 5 shows a memory map of the overall kit 12.

2. Dial numbers used in the United States will be described below.

The following codes are defined as follows:
code "N": corresponding to one of numbers 2 to 9
code "X": corresponding to one of numbers 0 to 9
code "0/1": corresponding to number 0 or 1
A dial number normally used in the United States is represented as follows:

0/1 + N0/1X + NXX + XXXX

Area Code (office number for long-distance call)  Prefix Code (office number for local call)

Dial Number for Local Call

Dial Number for Long-distance Call

Table 1 shows dial numbers used in the United States and including other dial number arrangements. In Table 1, items indicated by symbol * are dial numbers to be subjected to temporary storage processing in the kit 12, and items indicated by symbols are dial numbers to be subjected to carrier code addition determination in the kit 12.

TABLE 1

| Dial Number in the United States | |
| --- | --- |
| Dial Number | Purpose |
| * 0 | calling an operator (local) |
| * 00 | calling an operator (long distance) |
| * 01 | calling an operator (overseas) |
| N11 | free call (telephone number information, emergency) |
| NXX + XXXX | local call (coin) |
| 1 + N0/1X + NXX + XXXX | long-distance call (coin) |
| * 0 + NXX + XXXX | local call (password) (after the number in the left column is dialed, a password is dialed) |
| 0 + N0/1X + NXX + XXXX | long-distance call (password) (after the number in the left column is dialed, a password is dialed) |

TABLE 1-continued

| Dial Number in the United States | |
|---|---|
| Dial Number | Purpose |
| * 1 + 800 + NXX + XXXX | free dial (collect call) |
| * 01(1) + X ... X(#) | overseas call |
| * 10XXX + X ... X | carrier call (a user directly dials a carrier code) |

3. Brief Description of Functions

Figure 6:
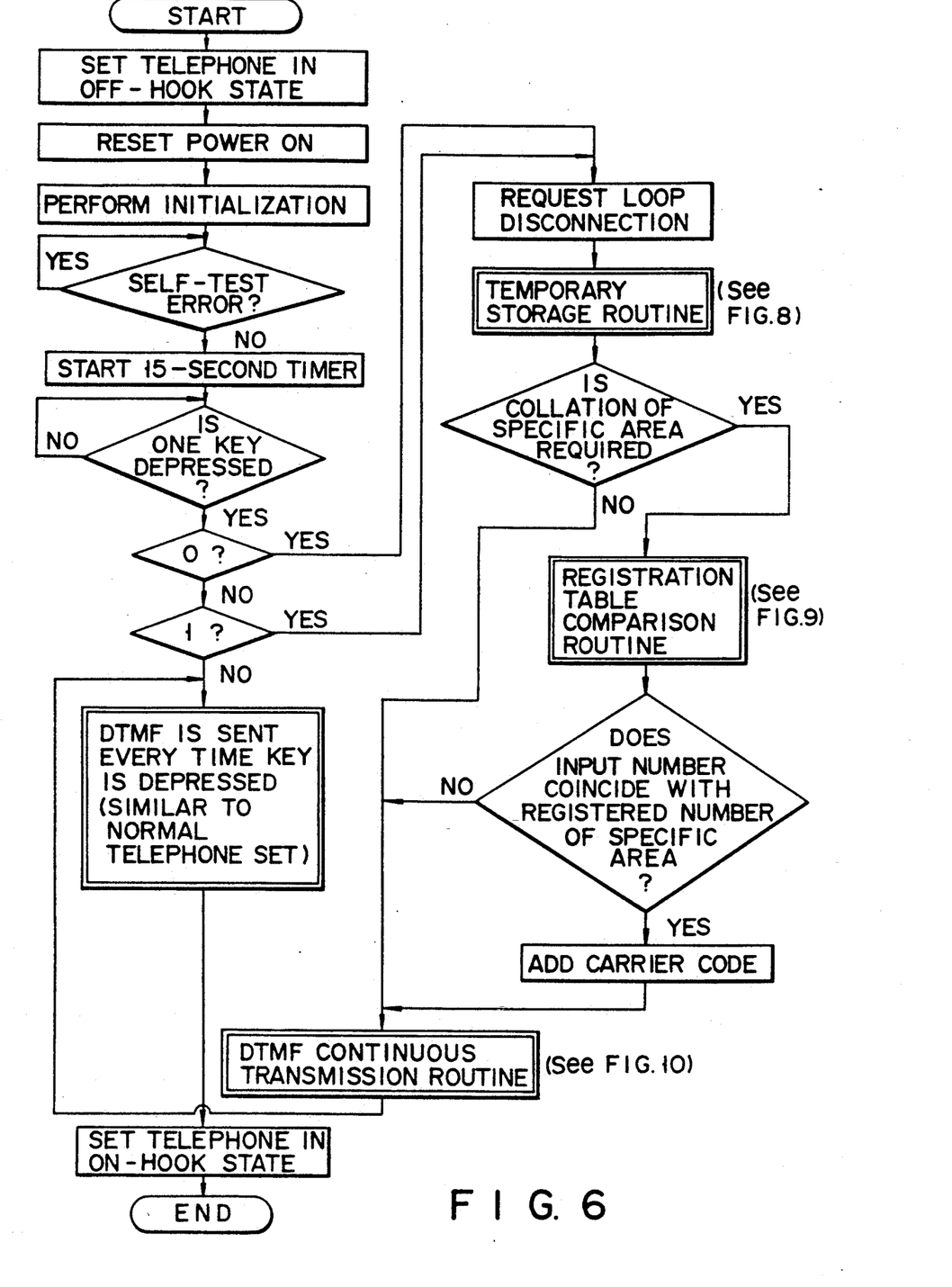
FIG. 6 is a flow chart for explaining functions of the embodiment of the present invention.

FIG. 6 is a flow chart for explaining functions of the kit of the present invention.

The kit 12 is constructed such that only when the first digit of the number dialed by a user is "0" or "1", the kit 12 temporarily stores the subsequent key-input digits and does not directly transmit them to the telephone line, determines input of the last digit, determines whether to add a carrier code after the last digit input determination, and continuously transmits necessary DTMF signals to the line.

If the first digit of the dial number is not "0" or "1", the kit 12 directly transmits DTMF signals corresponding to key inputs to the line in the same manner as in a normal telephone.

4. Determination of Carrier Code Addition

Whether to add a carrier code to an input dial number is determined by checking whether the input number coincides with a number of a "carrier-code-required area".

Carrier-code-required areas are set in a registration table in the EEPROM 127 as "area codes" and "prefix codes" in advance. The second to fourth digits of the input dial number are compared with a registered area code in the EEPROM 127. If they coincide with each other, and comparison with a prefix code is further required, the fifth to seventh digits of the input dial number are compared with the prefix code registered in the EEPROM 127.

If they coincide with each other in this case, "carrier code addition" is determined.

5. Detailed Description of Dial Functions

Figure 7:
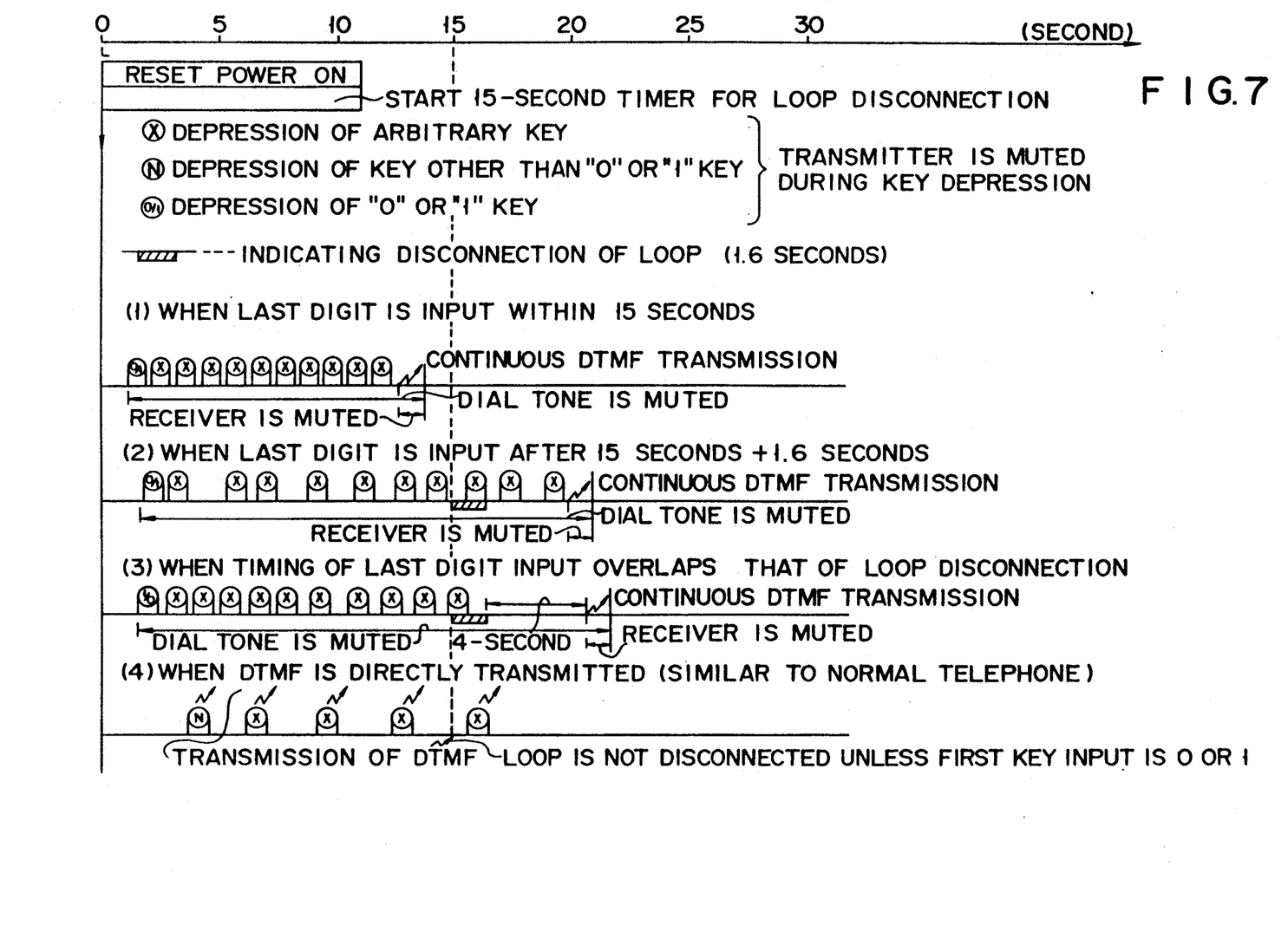
FIG. 7 is a timing chart of the embodiment.

FIG. 7 is a timing flow chart for explaining functions of Dial.

(1) Outline

A dial tone must be supplied to a user and the transmitter must be set in an operative state until the first digit is dialed. The function of the kit 12 is roughly divided into two functions depending on the first digit of the dial input, as follows.

If the first digit is either "#" or "*" or one of "2" to "9", the kit 11 performs the same function as that of a normal public telephone, i.e., processing from depression of keys of a keypad to DTMF transmission (see FIG. 7(4)).

The function of a normal public telephone is constituted by the following operations ① to ④ :

① While keys of the keypad are depressed DTMF signals are continuously transmitted to the line, and at the same time, a tactile sound is supplied to a user through the receiver.

② The receiver is set in a semi-mute state upon first depression of a key of the keypad. As a result, a dial tone from the telephone office overlaps the tactile sound, and the user can scarcely hear the tone.

③ When the first digit is key-input, the dial tone from the telephone office is stopped. Subsequently, no dial tone is output and hence a mute state is obtained.

④ While keys of the keypad are depressed, the transmitter is kept in a mute state.

If the first digit of the input dial number is "0" or "1", no DTMF signals are transmitted to the line until it is checked, upon determination of the last digit input, whether addition of a carrier code is necessary or not. However, an operation during this period must be as similar as possible to that of the function of a normal telephone for a user.

For this purpose, if the first dial number is "0" or "1", the following Ⓐ to Ⓖ functions are realized:

Ⓐ Although no DTMF signals are transmitted to the line during key input, a tactile sound is supplied to a user during depression of keys of the keypad.

Ⓑ Even if the first digit is "0" or "1", since no DTMF signal is actually transmitted to the line, a dial tone from the telephone office is not stopped. For this reason, the dial tone is muted at the same time when the first digit of "0" or "1" is dialed.

Ⓒ If a DTMF signal is not transmitted to the line within a predetermined time after a user key-inputs a number, "timeout" occurs in the telephone office, and a user is required to redial after setting the telephone in an on-hook state once. For this reason, even if the first digit is "0" or "1", if no DTMF signal is transmitted to the line 15 sec after an off-hook operation, the telephone is equivalently set in an on-hook state to disconnect the speech loop for 1.6 sec from this time point (see items (2) and (3) in FIG. 7).

Ⓓ If it is determined that DTMF signals can be continuously transmitted to the line, necessary DTMF signals are transmitted to the line by repeating ON/OFF control of the loop every 64 (ms).

Ⓔ New key input is inhibited during continuous transmission to the line in item Ⓓ.

Ⓕ The sound of the DTMF signals continuously transmitted to the line in item Ⓓ is not heard by the user by turning on an R mute.

Ⓖ If a key is depressed immediately after the continuous transmission to the line in item Ⓓ, a DTMF signal must be output as in a speech state of a normal telephone. In addition, both the transmitter and receiver must be set in an operative state.

Ⓗ If loop disconnection is performed at the start of continuous transmission of the dial number, DTMF signals are continuously transmitted after the loop disconnection is completed and the time required for the office to output a dial tone (in this case, four seconds) has elapsed, so that the coincidence between the timing of loop disconnection and that of continuous transmission may be prevented (see item (3) in FIG. 7).

(2) Dialed Number Temporary Storage Processing

Figure 8A:
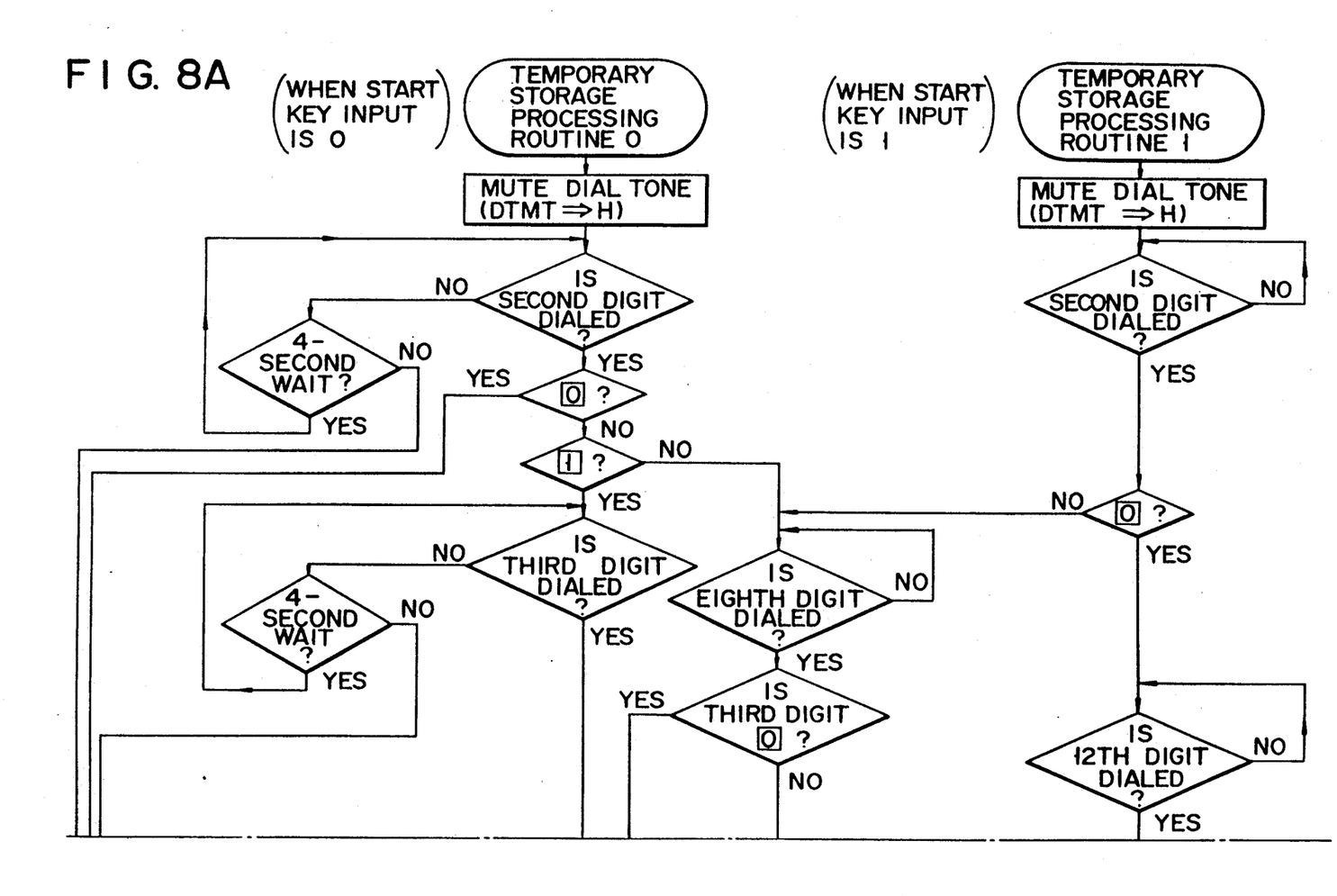
FIGS. 8A, 8B, 9A, 9B, 10A and 10B are flow charts each showing a detailed routine of the flow shown in FIG. 6.
Figure 8B:
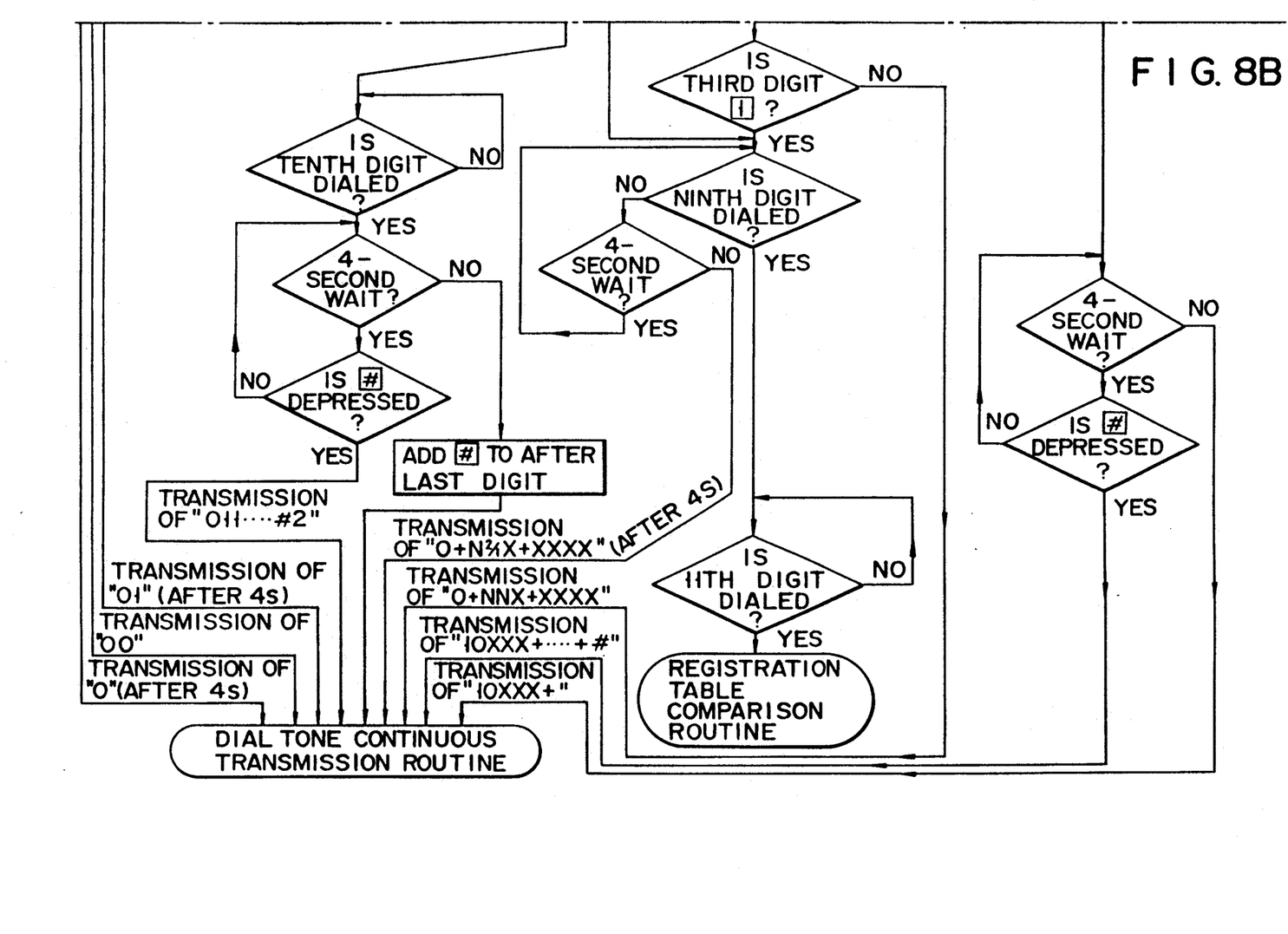

FIGS. 8A and 8B are flow charts showing a routine for dial number temporary storage.

If the first key input is "0" or "1", key data including the second and subsequent key inputs are temporarily stored in the RAM 130 until it is determined that DTMF signals can be transmitted.

If the last digit can be determined from the input dial number, the key inputs to the last digit are temporarily stored. If registration table comparison is required immediately after input of the last digit is completed, the flow advances to a routine for comparing the registration table with the input dial number. If registration table comparison is not required, the flow advances to a dial number continuous transmission routine.

The last digit may not be determined depending on an input dial number. In this case, if no key input is performed for 4 sec or more, it is determined that no more key input is performed, and the preceding key data is continuously transmitted.

Since no DTMF signals are transmitted to the line during dial number temporary storage processing, a dial tone from the telephone office is continuously supplied. For this reason, the dial tone is muted during the temporary storage processing (note that the sound of a DTMF signal is supplied as a tactile tone).

In addition, in order to prevent timeout in the telephone office, the loop is disconnected for 1.6 sec every 15 sec from the time of an off-hook operation during dial number temporary storage processing.

Table 2 shows digit determination based on the input dial number.

(i) Loop disconnection request is canceled (even after the continuous transmission processing).
(ii) Key input is inhibited.
(iii) A dialer amplifier is turned on (DAON=H).
(iv) The receiver is muted to prevent a continuous transmission sound from being heard by a user (RMUT=H).
(v) The transmitter is muted (TMUT=H).

Upon completion of continuous transmission of the dial number, the mute states of the transmitter and the receiver are canceled, the dialer amplifier is turned off, the keypad is set in an operative state, and the mute state of the dial tone is canceled, thereby restoring a normal speech state.

(4) Registration Table Comparison Processing

Figure 10A:
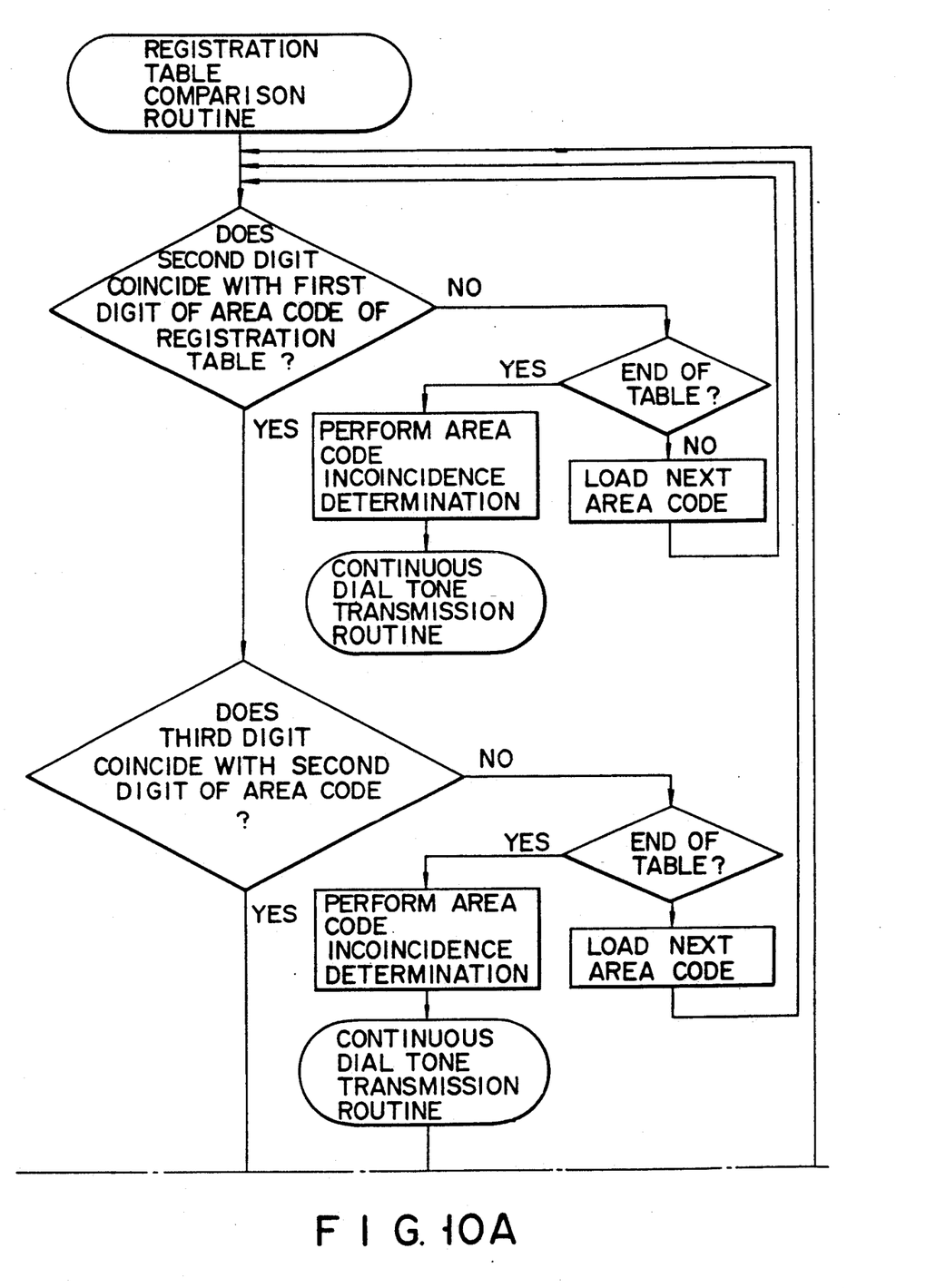
Figure 10B:
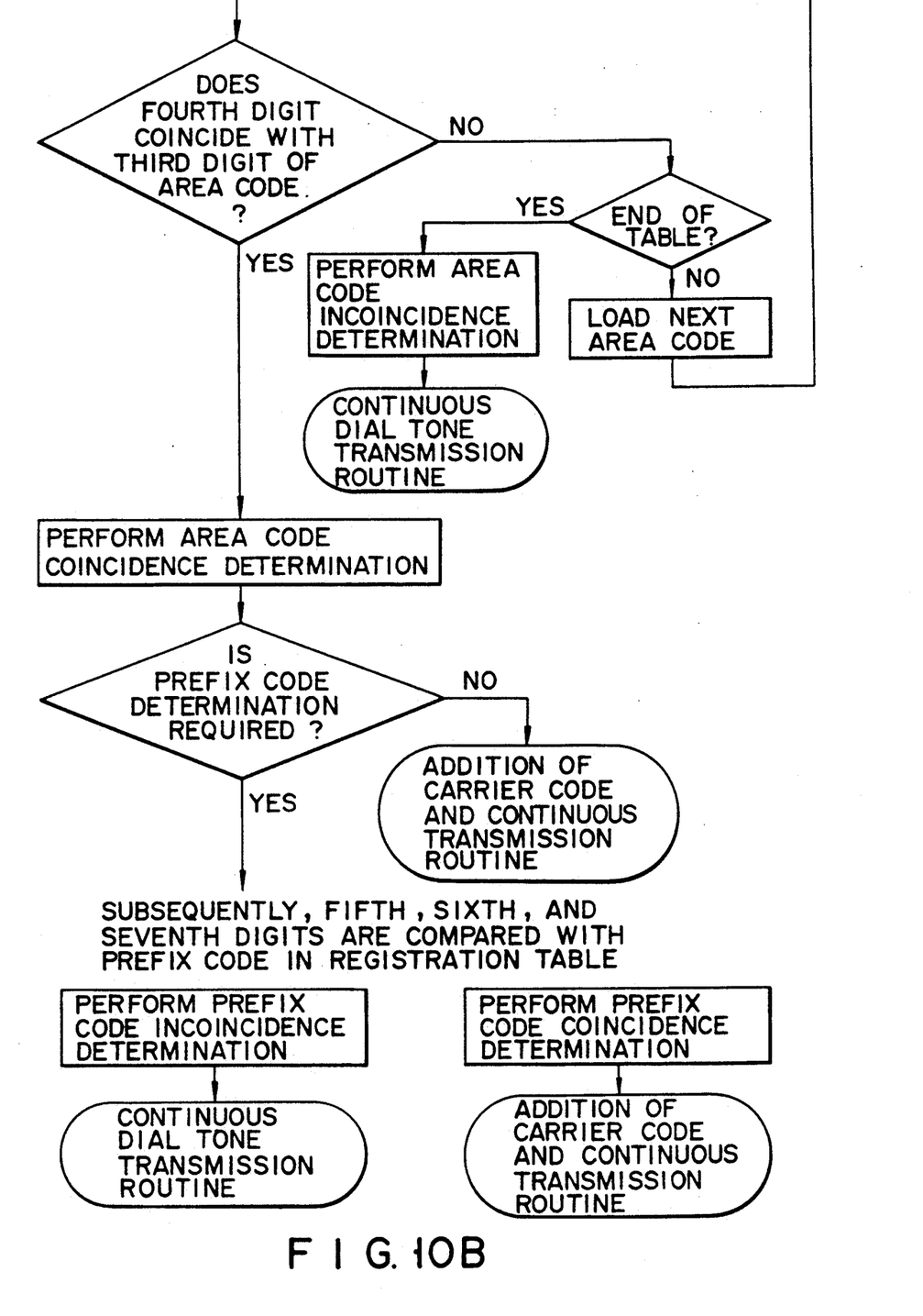

FIGS. 10A and 10B are flow charts showing a registration table comparison routine.

If the last digit of a 11-digit key input represented by

TABLE 2

Digit Determination Based on Dial Input

| No. | Dial Input | After Last Key Input | Timing of Last Digit Determination |
|---|---|---|---|
| ① | 0, 01 | key input is possible in cases of inputs ② to ⑦ | determination after 4 sec. |
| ② | 00 | no dial number is possible with key input of third and subsequent digits | determination immediately after last digit input |
| ③ | 0/1 + NNX + XXXX | no dial number is possible with key input of ninth and subsequent digits | determination immediately after last digit input |
| ④ | 0/1 + N0/1X + XXXX | key input ⑤ is possible after ninth and subsequent digits | determination after 4 sec. |
| ⑤ | 0/1 + N0/1X + NXX + XXXX | no dial number is possible with key input of 12th and subsequent digits | determination immediately after last digit input |
| ⑥ | 011 + X...X | subsequent key input is possible (overseas call) | determination after 4 sec. |
| ⑦ | 011 + X...X + # | # key indicates last digit input | determination immediately after last digit input |
| ⑧ | 10XXX + X...X | subsequent key input is possible | determination after 4 sec. |

(3) Processing after Key Input

① Direct transmission of DTMF

If the first key input is either "#" or "*" or one of "2" to "9", a DTMF signal is transmitted to the line in synchronism with key input.

Since DTMF signals are sequentially transmitted upon key input, prevention of timeout in the telephone office is not necessary.

While no key is depressed, both the transmitter and the receiver are set in an operative state, and the flow keeps waiting for a key input or an on-hook operation.

② Continuous DTMF transmission

Figure 9A:
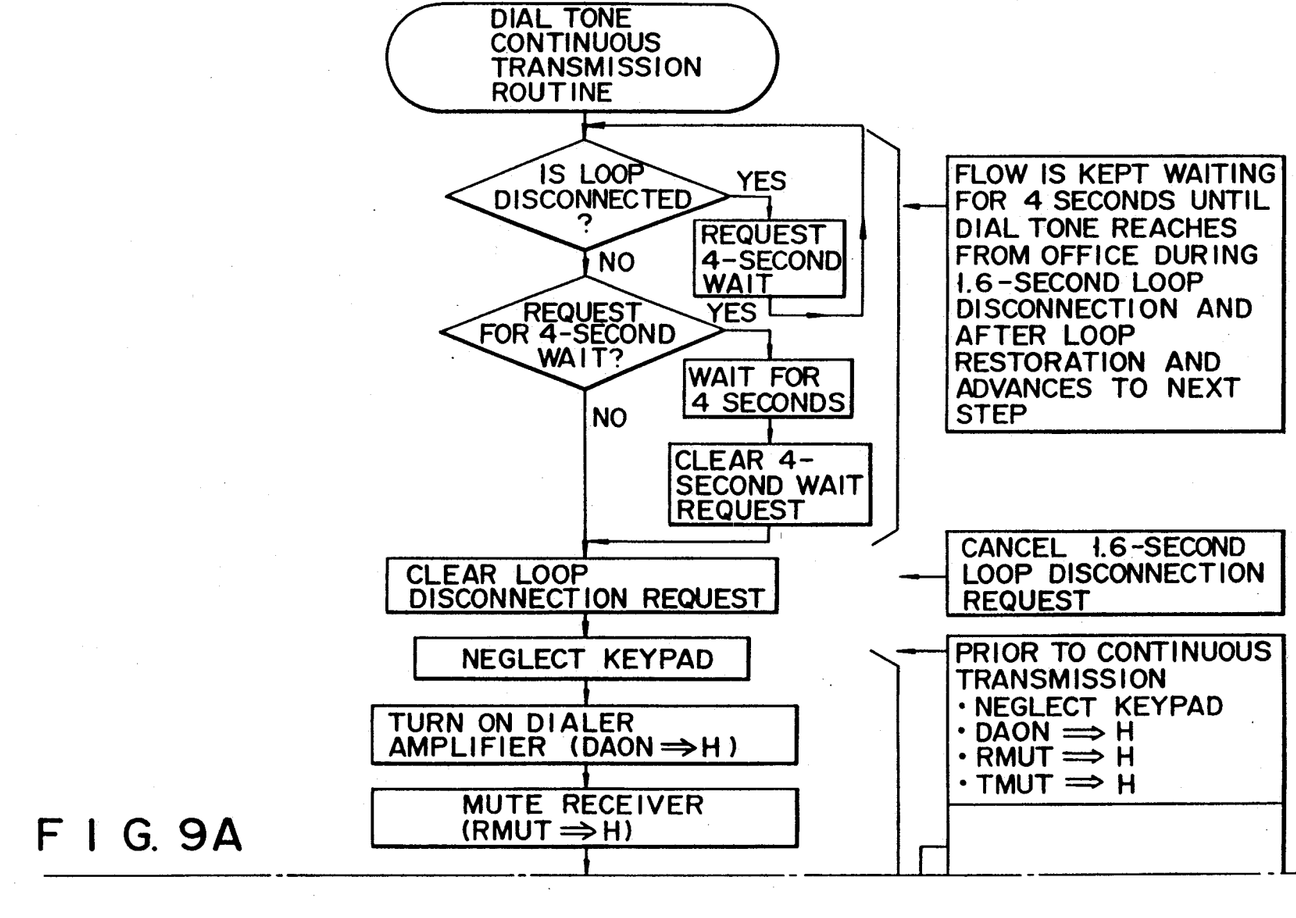
Figure 9B:
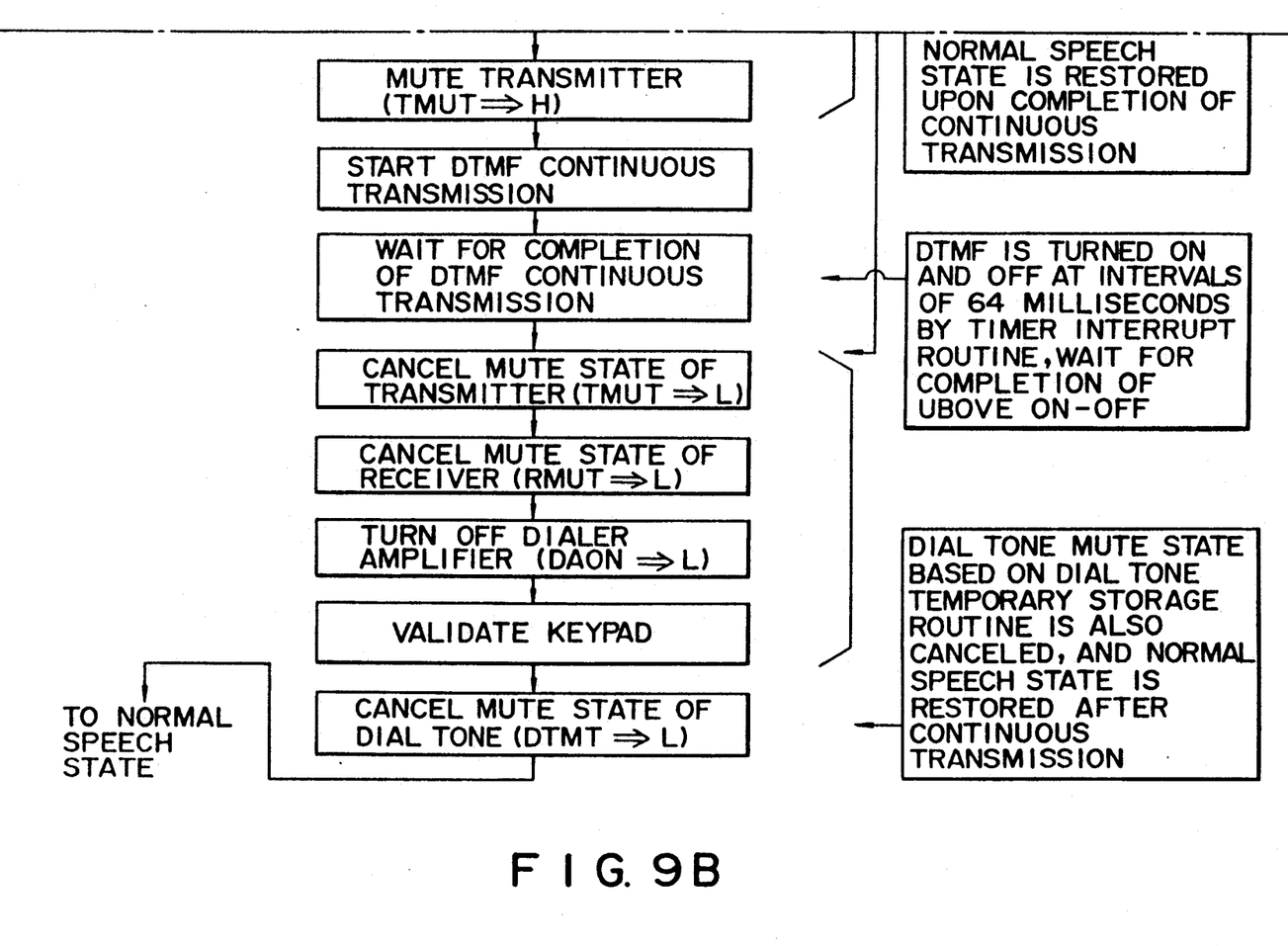

FIGS. 9A and 9B are flow charts showing a continuous DTMF transmission routine.

After digit determination, DTMF signals are transmitted to the line upon ON/OFF operation of the loop every 64 ms. If the addition of a carrier code is required as the result of a registration table comparison, a carrier code is added in advance, and DTMF signals corresponding to digits of the input dial number are transmitted (also by ON/OFF operation every 64 ms).

The following operations (0) to (v) are continuously performed during continuous transmission of the first digit to the last digit regardless of ON/OFF control for DTMF signals:

(0) A mute state of a dial tone (DTMT=H) is continued from processing for dial number temporary storage.

0/1+N0/1X+NXX+XXXX is determined in the dial number temporary storage processing, the flow immediately advances to the registration table comparison processing.

In registration table comparison, a designated address (the first digit of an area code) is compared with the second digit of the dial input. If they coincide with each other, the third and fourth digits of the dial input are compared with the second and third digits of the area code. If they do not coincide with each other, the dial input is compared with the next area code (an address five addresses ahead of the current address).

If they coincide with each other, comparison with prefix codes will be performed in substantially the same manner as in comparison with area codes.

If coincidence determination with an area code and a prefix code is obtained and carrier code addition is determined, addition of a carrier code is performed, and the flow advances to the continuous transmission routine of the dial number.

If carrier code addition is not determined, the flow directly advances to the continuous transmission routine of the dial number.

(5) Carrier Code Addition Processing

If it is determined by the registration table comparison processing that carrier code addition is necessary, a carrier code is forcibly stored in the RAM 130, in which a dial input has been temporarily stored during dial number temporary storage processing, from the first digit, and the prestored dial input is shifted by the number of digits of the carrier code.

Upon completion of storage of the carrier code and shift of the dial input in the RAM 130, the flow advances to the continuous transmission routine of the dial number.

As is apparent from the above-described embodiment, according to the dial unit of the present invention, which allows a public telephone to respond to equal access, the following advantages can be ensured: ① the dial unit can be detachably mounted on an already-installed public telephone or incorporated in a public telephone to be newly installed without cumbersome rearrangement of software in a telephone office (exchanger) or installation of a repeater; ② a user and a telephone office are allowed to handle a public telephone, in which the dial unit is mounted, in the same manner as in operation of a normal public telephone, and easy maintenance and compatibility are ensured.

As has been described in detail above, according to the present invention, there is provided an excellent dial unit which is detachably mounted on a public telephone for equal access, and is constructed and arranged to add a carrier code to the front portion of only an input dial signal for calling a specific area (destination) upon a determination step, and to allow the telephone to be handled in the same manner as in operation of a normal telephone, including the conventional operations, with respect to dial signals to other areas, in an easy manner with high reliability.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A dial unit adapted to be detachably mounted on a public telephone for equal access, said dial unit comprising:

keypad means for key-inputting dial digits:

memory means in which area codes corresponding to specific destinations to be handled as a long-distance call, and a carrier code corresponding to a specific carrier line having a right of a carrier to each specific destination, are stored in advance;

determination processing means comprising:
   (a) dial digit determination means for identifying either one of a "1" or a "0" as a first digit of dial digits key-input by said keypad means, or a digit other than a "1" or a "0" as said first digit;
   (b) dial digit storage means for temporally storing all of the dial digits key-input by said keypad means, when one of "1" and "0" as the first digit is identified by said dial digit determining means;
   (c) equal access determining means for determining either a coincidence or a non-coincidence of an area code part of the dial digits temporarily stored in said dial digit storage means, with one of the area codes corresponding to a specific destination stored in said memory means in advance; and
   (d) carrier code adding means for adding a carrier code stored in said memory means in advance and corresponding to a specific carrier line, to a front portion of said dial digits temporarily stored in said dial digit storage means, when a coincidence is determined by said equal access determining means; and transmitting means comprising:
   (a) first converting means for converting the dial digits, when other than a "1" or a "0" is identified by said dial digit determination means, into corresponding DTMF signals in synchronism with key input by said keypad means;
   (b) first speech control means for sequentially transmitting the DTMF signal converted by first converting means to a telephone line connected to the public telephone;
   (c) second converting means for converting the dial digits, which are temporarily stored in said dial digit storage means when a non-coincidence is determined by said equal access determining means, or the dial digits with the carrier code added by said carrier code adding means, into corresponding DTMF signals, and
   (d) second speech control means for sequentially transmitting the DTMF signals converted by said second converting means to the telephone line in a correct dialing sequence after a key input operation by said keypad means is completed.

2. A unit according to claim 1, wherein prefix codes corresponding to the specific destinations are also stored in said memory means, and said equal access determining means includes means for determining a coincidence of a prefix code of the dial digits temporarily stored in said dial digit storage means with one of the prefix codes stored in said memory means, upon a determination of a coincidence between an area code part of the key input dial digits with one of the area codes temporarily stored in the dial digit storage means.

3. A unit according to claim 1, comprising loop control means for preventing a timeout by a telephone office, including means for temporarily disconnecting an electrical connection between the public telephone and the telephone line so as to set the public telephone in an equivalent on-hook state a predetermined period of time after the public telephone is set in an off-hook state, while said dial digit storage means continues to operate by temporarily storing dial digits being input by said keypad means.

4. A unit according to claim 1, comprising power source circuit means for performing a charging operation using a communication loop current supplied from the telephone line during an off-hook period of the public telephone, including means for converting the current into a predetermined power source voltage having a predetermined backup duration, and for applying the predetermined power source voltage as at least a driving voltage for said determination processing means.

5. A unit according to claim 1, wherein said determination processing means includes means for generating a control command for performing tactile sound and dial tone processing equivalent to operation of a normal telephone while said dial digit storage means continues to operate by temporarily storing the dial digits being input by said keypad means, and said transmitting means includes means for selectively muting a tactile sound and a dial tone in accordance with the control command.

* * * * *